R. F. FOWLER.
Devices for Reducing and Screw-Threading Rods.

No. 141,342. Patented July 29, 1873.

Witnesses: Jennie M. Grant, Andrew Choffin

Robert F. Fowler, Inventor
by Job Abbott, Attorney.

UNITED STATES PATENT OFFICE.

ROBERT F. FOWLER, OF CANTON, OHIO, ASSIGNOR TO HIMSELF AND CHAS. T. MARTINCOURT, OF SAME PLACE.

IMPROVEMENT IN DEVICES FOR REDUCING AND SCREW-THREADING RODS.

Specification forming part of Letters Patent No. 141,342, dated July 29, 1873; application filed June 8, 1872.

*To all whom it may concern:*

Be it known that I, ROBERT F. FOWLER, of Canton, in the county of Stark and State of Ohio, have invented certain new and useful Improvements in Shaft and Thread Cutters; and that the following is a full, clear, and exact specification thereof, which will enable others skilled in the art to make and use the said invention.

My invention relates to the construction of a cutter-head consisting of a base-plate provided with a guide-sleeve, through which the shaft, bolt, or pipe to be operated upon is inserted; a top clamping-plate secured by axial bolts to the base-plate, and three or more cylindrical cutters arranged upon said axial bolts and held from turning by being clamped between said top and base plates, said cutters having their cutting-grooves arranged in different planes, so as to follow the thread cut on the bolt or pipe, and thus act to feed the bolt or pipe up to the cutter-head without the aid of outside mechanism, and the said top and base plates being provided with holes for the axial bolts spirally arranged therein, to allow of the adjustment of the cutters for different-sized bolts, without materially weakening the top or base plate at any point. My invention also relates to the combination, with the cutter-head above described, of three or more peculiarly-formed cutters, by which said head is adapted to turning down shafting or like cylindrical bodies.

Figure 1:
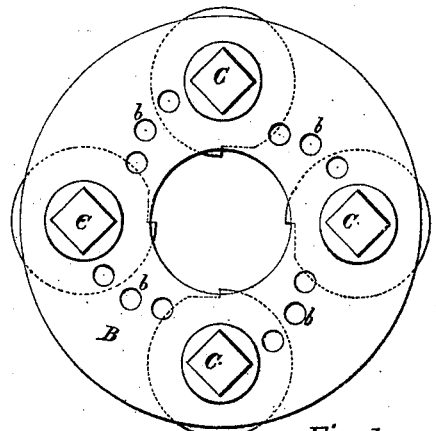
Figure 4:
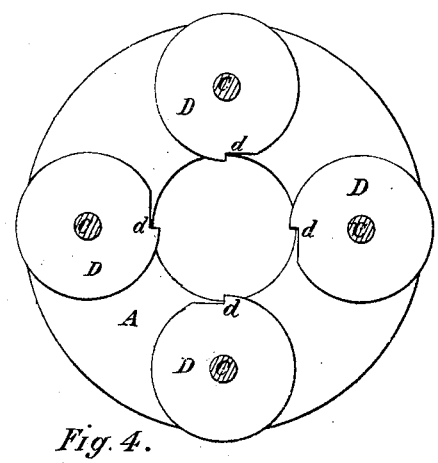
Figure 3:
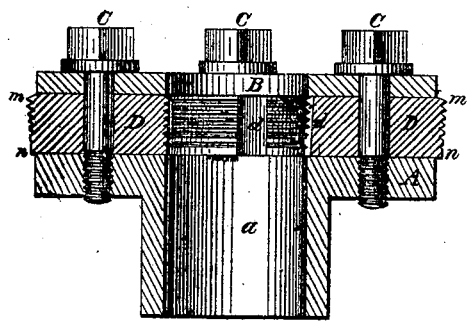
Figure 2:
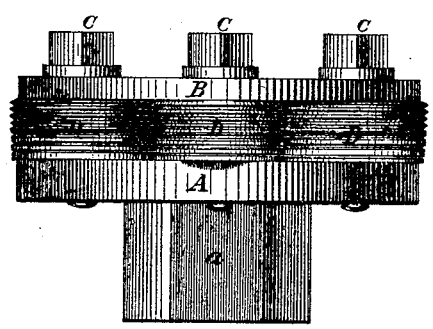
Figure 6:
Figure 5:

In the accompanying drawing, Figure 1 is a plan view of a cutter-head embodying my invention. Fig. 2 is a side view of the same. Fig. 3 is a vertical section of the same. Fig. 4 is a plan view of the same with the top plate removed. Figs. 5 are side views of the cylindrical cutters. Fig. 6 is a side view of a cylindrical cutter for shafting.

A is the base-plate of the cutter-head, on the under side of which is the guide-sleeve $a$, through which the shaft or bolt to be cut is inserted, and which serves to keep the shaft true while being cut. B is the top plate of the cutter-head, which is made with a central hole to allow of the passage of the shaft or bolt through it, and which is connected to the base-plate A by three or more bolts, C, which pass through the holes $b$, and screw into corresponding threaded holes in the plate A, or into nuts placed under said plate. The cutters D, shown in the cutter-head, are adapted to cutting threads on bolts, rods, or gas-pipe, and are of a circular section, their upper dimensions $m\ m$ being slightly greater than their lower dimensions $n\ n$, so that the first part $n$ will cut down the first part of the screw-thread groove, and the last part $m$ will cut out the bottom of said groove in order to finish the thread at one passage of the cutter. The grooves around the cutter are arranged in different planes, as will be seen in Figs. 5, where $x\ x$ is a horizontal line laid on the successive cutters $D^1\ D^2\ D^3\ D^4$, thus bringing the several grooves in proper position to follow over the required screw-thread, and the cutting-edge is obtained by forming the vertical groove $d$ in the side of the cutters, as seen in Figs. 1 and 4. The several cutters D are placed between the plates A B of the cutter-head, where they are secured by the bolts C, which pass through holes in the centers of the cutters, and clamp said cutters between the top and base plates A B.

The cutters being secured in the position shown in Figs. 1 and 4, it is seen that the corners of the grooves $d$ form cutting-edges, which will cut the required thread on the bolt or pipe inserted through the sleeve $a$, and it will be also seen that these cutting-edges can be readily sharpened by loosing the screws C and turning the cutters D around, and then filing back the notch $d$, which process can be repeated as often as required until the whole circumference of the cutters has been worn away.

Four cutters are shown in the cutter-head in the drawing; but more could be used if desired, and three cutters could be often used in place of four, as three would ordinarily be sufficient to preserve the proper position of the bolt in the center of the cutter-head. The same cutter-head can also be used for different-sized bolts by changing the bolts C into different holes $b$, and by slipping an auxiliary sleeve of the proper size into the guide-sleeve $a$.

When this cutter is used for dressing down shafting to a cylindrical form the cutters F to be used are of the form shown in Fig. 6, the lower edge $k$ being rounded off to take the first chip from the shaft, and the sloping edge $k\ i$ serving to reduce the shaft to the required size, while the straight edge $i\ h$ serves to finish up the shaft, the cutting-edge being formed by a groove, $f$, in the side of the cutter, as in the screw-thread cutters D, and the several cutters being secured in the head A B, as before described.

I lay no claim to the construction of the cylindrical thread-cutting dies herein described, as similar dies have been before shown and described in Letters Patent granted to John Griffith, January 18, 1853; but, confining myself to the construction and combination of cutter-head and thread or shaft dies or cutters as herein set forth,

What I claim as my invention is—

1. The herein-described cutter-head A B C D, consisting of the base-plate A, with guide-sleeve $a$, top clamping-plate B, axial clamping-bolts C C C inserted in spirally-arranged bolt-holes $b\ b\ b$, and thread-cutters D D D, having their thread-cutting edges arranged in different planes, so as to follow the screw-thread on the bolt or pipe, the several parts being combined and operating as herein specified.

2. The shaft-cutters F, having their cutting-edges $k\ i\ h$ formed as described, in combination with the cutter-head A B C, substantially as and for the purpose herein specified.

ROBERT F. FOWLER.

Witnesses:
 JENNIE M. GRANT,
 ANDREW CHOFFIN.